Patented Dec. 12, 1922.

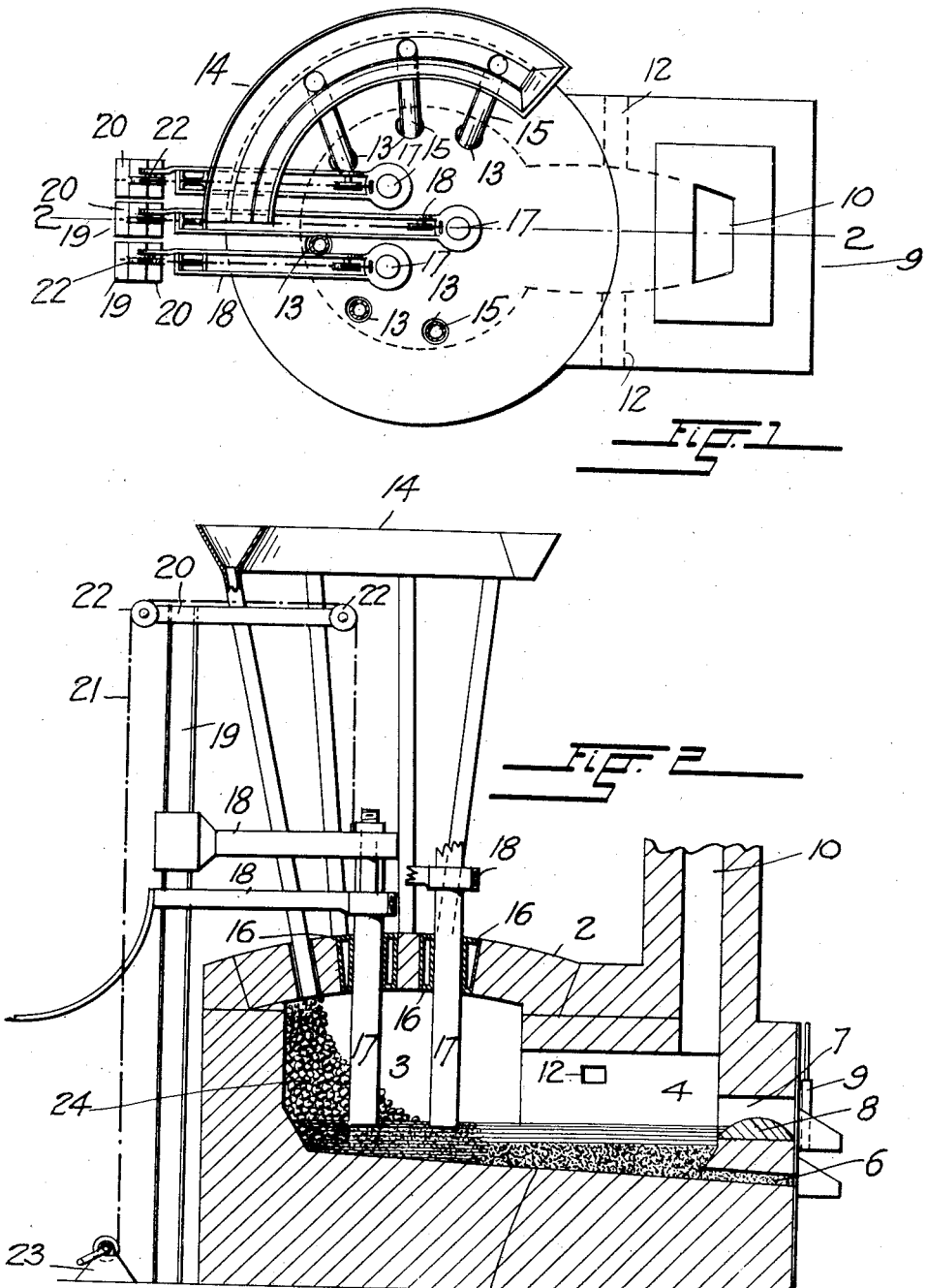

1,438,381

UNITED STATES PATENT OFFICE.

ROBERT M. KEENEY, OF DENVER, COLORADO.

ELECTRIC REVERBERATORY FURNACE.

Application filed December 5, 1919. Serial No. 342,678.

*To all whom it may concern:*

Be it known that I, ROBERT M. KEENEY, a citizen of the United States, residing at Denver, in the county of Denver and State of Colorado, have invented certain new and useful Improvements in Electric Reverberatory Furnaces, of which the following is a specification.

This invention relates to furnaces for smelting ores and other materials, and its primary object is to provide an electric reverberatory furnace in which an electric current is caused to pass through an automatically maintained shallow bed of fresh material in a closed smelting chamber for the generation of heat of the very high temperature essential to the rapid and complete reduction of refractory ores and concentrates.

Another object of my invention is to provide in a furnace of the aforesaid type, means for the introduction of air into the gases of combustion at the proper moment in the smelting process to obtain a substantially complete combustion of these gases.

A further object of my invention is to provide a method of feeding the charge, which protects the walls of the smelting chamber from the intense heat generated by the current flow through the shallow bed of material in the smelting zone, and still another object is to provide in a smelting furnace a region continuous with the smelting zone in which the matte settles from the slag immediately after its fusion in a continuous operation.

With the above and other objects in view, my invention consists in the construction and arrangement of parts illustrated in the accompanying drawings in which—

Figure 1 is a plan view of my improved electric reverberatory furnace, and

Figure 2, a section taken on the line 2—2, Figure 1.

Referring to the drawings by numerals, 2 designates a hollow structure built of or lined with refractory material, the interior of which is formed into a preferably cylindrical smelting chamber 3, and a therewith continuous settling chamber 4 of reduced and tapering width.

The two chambers have a common continuous floor 5, which slopes gently toward the wall of the furnace at the end of the settling chamber, said wall having in alinement with the floor, a tap opening 6 for the outlet of matte and above the same, a separate opening 7 for the discharge of slag.

A dam 8 built in the slag-discharge opening determines the level of the material in the settling chamber, and a sliding gate 9 is provided to prevent the escape of heat from the furnace.

An upwardly extending flue 10 at the end of the settling chamber connects as usual with a dust collector, and openings 12 in the opposite side walls of the same chamber provide for the admission of air to the gases of combustion passing from the smelting chamber.

The smelting chamber of the furnace has in its roof in close proximity to its circumferential wall a number of equidistantly spaced charging holes 13 which connect separately with a superposed bin 14 of suitable size and construction through the medium of a corresponding number of chutes 15.

Arranged in triangular formation in the central portion of the roof of the smelting chamber are three openings lined with water-cooled boxes 16 for the passage of electrodes 17 which are connected in a circuit with a conveniently located source of electricity.

The electrodes are mounted at their upper ends outside the furnace in holders 18 which have a sliding movement on the upright standard 19 of gallowses 20 from which they are separately suspended by means of ropes or chains 21 trained over sheaves 22 at the top of the gallowses and connected with windlasses 23 at the foot of the same.

The lower ends of the electrodes are spaced from each other at a short distance above the floor of the smelting chamber and by adjusting the electrodes through the medium of the windlasses this space may be maintained to compensate for consumption, or varied to regulate the electric load on the furnace.

It will be understood without further illustration that time-controlled mechanism for automatically feeding the electrodes may be used to good advantage.

In the operation of the furnace, material passing from the feed bin through the charge holes in the roof of the smelting chamber flows along the circumferential wall of the chamber onto the floor of the same somewhat in the manner shown at 24 in Figure 2.

Owing to the multiplicity of the charge holes and their arrangement around the smelting chamber, the charge is evenly distributed along the wall of the same which is thereby fully protected against the destructive influence of the heat generated by the current passing between the electrodes.

The material which is fed at regular intervals into the furnace, flows from the circumference of the smelting chamber to the central portion of its floor and into the smelting zone around the lower ends of the electrodes, where it forms into a shallow bed which is rapidly heated not only by the passage of current between the points of the electrodes, but also by reflection of the heat generated by the current flow, from the roof of the smelting chamber.

The heat passing from the bottom up through the thin bed of charge in the smelting zone and back to the upper portion of the same by reflection from the roof in the closed chamber, develops a temperature sufficiently high to smelt the most refractory ores.

As the charge in the smelting zone melts, its matte and slag flow gradually along the slanting floor into the settling chamber 4 in which they separate while a proportionate quantity of fresh material is fed into the zone from the supply against the wall of the smelting chamber.

The melted slag and matte in the settling chamber are kept on a level determined by the height of the dam in the slag discharge opening, which causes them to back up around the electrodes in the smelting chamber so that there is at all times a sufficient quantity of slag and matte in the smelting zone to assure a continuous passage of the electric current.

The contents of the settling chamber are kept at a high temperature by the gases of combustion passing from the smelting chamber to the flue which connects the furnace with the usual dust chamber.

Upon entering the settling chamber any unoxidized sulfur and SO in the gases are burned to $SO_2$ by the addition of air through the ports 12 before the gases are drawn out of the furnace through the flue.

The matte and slag separated in the settling chamber are drawn off as required through the outlets 6 and 7, or the slag may be allowed to overflow continuously at a level determined by the height of the dam in the slag-discharge opening.

The method of heating an automatically maintained thin bed of ore from opposite sides by a direct application of heat and by reflection, produces a rapid and complete smelting action at a very high temperature which prevents the formation of accretions on the furnace bottom and makes it possible to smelt lump ore as well as fine ore or ore concentrates.

The use of electricity as a heating medium, moreover permits of the use of iron sulphide as a collecting agent for gold and silver by reason of the absence of carbon in the fuel.

The thin bed of ore also allows the gases to escape at a low velocity with little or no dust, thereby permitting the smelting of flotation and other fine concentrates without any material loss.

The provision of a settling chamber immediately adjoining the smelting chamber as a continuity thereof, causes a clean separation of the matte and slag undisturbed by the addition of fresh material to the smelting zone or the agitation caused by the passage of electric current, and the novel method of charging the furnace allows the smelting zone to continuously feed itself in proportion to the discharge of melted matter to the settling chamber and at the same time protects the wall of the furnace from the heat of the upwardly moving and reflected gases.

What I claim and desire to secure by Letters Patent is:

1. An electric smelting furnace comprising a smelting chamber, a settling chamber, and a passage narrower than the first-mentioned chamber, by which melted matter and gases of combustion produced in the smelting chamber may freely enter the settling chamber, electric heating means establishing a determinate melting zone on the floor of the smelting chamber, in line with said passage, and means for feeding material laterally into said zone, the smelting chamber having a flue opening for the escape of gases of combustion and an opening for the outflow of melted matter below the upper level of said passage.

2. In an electric smelting furnace, a smelting chamber having a reduced outlet for melted matter and gases of combustion, electric heating means establishing a melting zone on the floor of said chamber in line with the outlet, and means for feeding material laterally into said zone.

3. In an electric smelting furnace, a smelting chamber having a reduced outlet for melted matter and gases of combustion, electric heating means establishing a melting zone on the floor of said chamber, spaced from the circumference thereof and in line with the outlet, and means for feeding material circumferentially into said zone.

4. In an electric smelting furnace, a circular smelting chamber having a reduced outlet for melted matter and gases of combustion, electric heating means establishing a central melting zone on the floor of said chamber in line with the outlet, and means for feeding material circumferentially into said zone.

5. An electric smelting furnace comprising an electrically heated smelting chamber and a settling chamber having its floor continuous with that of the smelting chamber, there being a passage above the floor for the unrestricted flow of molten material and gases from one chamber to the other, and the settling chamber having a flue-opening for the escape of gases of combustion and an opening for the outflow of melted material.

6. An electric smelting furnace comprising an electrically heated smelting chamber and a settling chamber having its floor continuous with that of the smelting chamber, there being a passage above the floor for the unrestricted flow of molten material and gases from one chamber to the other, and the settling chamber having a flue-opening for the escape of gases of combustion and at its end remote from that at which the material enters, an opening for the outflow of melted material.

In testimony whereof I have affixed my signature.

ROBERT M. KEENEY.